(12) United States Patent
Berkner et al.

(10) Patent No.: US 8,255,340 B2
(45) Date of Patent: Aug. 28, 2012

(54) METHOD AND APPARATUS FOR RISK ANALYSIS OF PUBLISHED LOGS

(75) Inventors: Kathrin Berkner, Menlo Park, CA (US); Michael Gormish, Redwood City, CA (US); Martin Boliek, San Francisco, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 1000 days.

(21) Appl. No.: 12/244,707

(22) Filed: Oct. 2, 2008

(65) Prior Publication Data

US 2010/0088551 A1    Apr. 8, 2010

(51) Int. Cl.
*G06N 5/00* (2006.01)
(52) U.S. Cl. ............................................. 706/12; 706/45
(58) Field of Classification Search ..................... 706/12, 706/45
See application file for complete search history.

(56) References Cited

OTHER PUBLICATIONS

Feng, et al., Bayesian Structural Content Abstraction for Image Authentication using Markov Pixon Model, Proceedings of the Fourth International Conference on Machine Learning and Cybernetics, Guangzhou, Aug. 18-21, 2005, pp. 5290-5296.*
Castagnoli, et al., Optimization of Cyclic Redundancy-Check Codes with 24 and 32 Parity Bits, IEEE Transactions on Communications, vol. 41, No. 6, Jun. 1993, pp. 883-892.*
Arieli, On the Relation Between Undetected Errors and the Error Detection Criteria of a Reed-Solomon Decoder Correcting Errors and Erasures, Electrical and Electronics Engineers in Israel, 1996., Nineteenth Convention of, Nov. 5-6, 1996, pp. 467-470.*

* cited by examiner

*Primary Examiner* — Wilbert L Starks
(74) *Attorney, Agent, or Firm* — Blakely, Sokoloff, Taylor & Zafman LLP

(57) ABSTRACT

A method and apparatus for analyzing risk associated with published logs are described. In one embodiment, the method comprises accessing a first log published to one or more logs. In one embodiment, the method may also comprise estimating a probability that an entry within the first log will not be verifiable from a second entry selected from one o the one or more logs.

21 Claims, 10 Drawing Sheets

METHOD AND APPARATUS FOR RISK ANALYSIS OF PUBLISHED LOGS

FIELD OF THE INVENTION

The present invention relates to the field of digital object distribution; more particularly, the present invention relates to analyzing risk associated with published logs.

BACKGROUND OF THE INVENTION

Many document management systems have been proposed and implemented in the past. These document management systems include systems that store documents and respond to a variety of requests. However, these systems do not easily operate across organizational boundaries and do not perform necessary synchronization and verification e.g. in the case of an audit.

A log is a document management tool used to record information. Logs may use a client-server framework to permit the addition of information from one or more client locations to a server that hosts the log. Because one server hosts each log, such logs are typically anchored to a particular HTTP location.

Logs are designed to provide a reliable history which in turn provides the basis of trust. Current business processes such as double entry accounting and paper trails provide traceability and support for auditing. Verification of electronic log files is necessary to provide similar accountability to that provided by paper. Verification of logs is critical in ensuring the integrity of a log, the log's history, and content referenced by the log.

SUMMARY OF THE INVENTION

A method and apparatus for analyzing risk associated with published logs are described. In one embodiment, the method comprises accessing a first log published to one or more logs. In one embodiment, the method may also comprise estimating a probability that an entry within the first log will not be verifiable from a second entry selected from one of the one or more logs.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
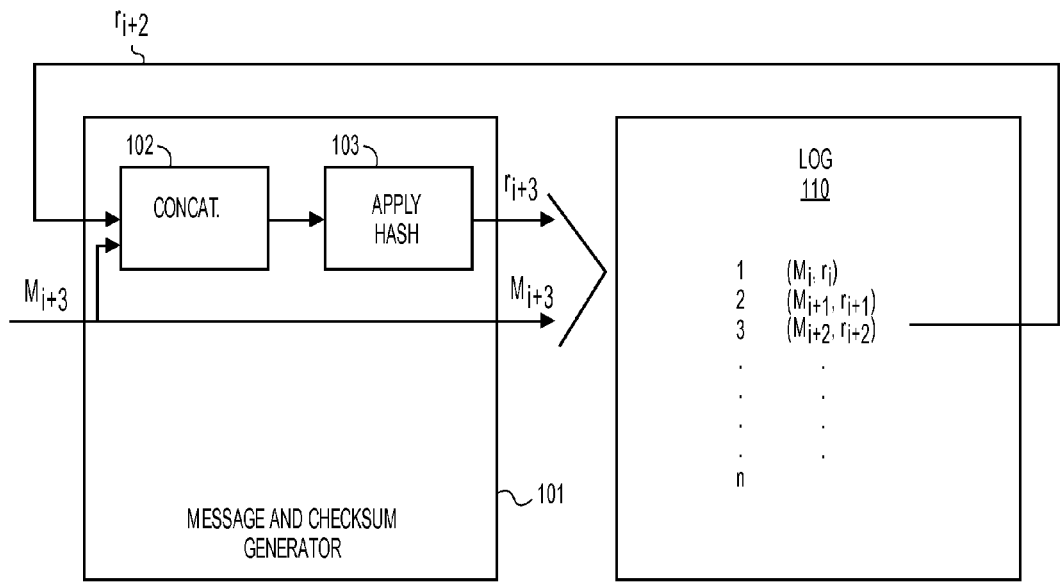
FIG. 1 illustrates generating and storing an entry in a log.

A method, apparatus, and article of manufacture for estimation of risk of verification failure for published logs are described. In one embodiment, a first log published to one or more logs is accessed. A log is a sequential list of values for content associated with the log, which may be utilized as part of a verification mechanism. In one embodiment, a probability that an entry within the first log cannot be verified is estimated. In one embodiment, a publication protocol from a set of publication protocols for entangling logs is selected based on the estimation.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Media Identifiers, Sequential Logs, and Entangling
Media Identifiers for Electronic Items Many of the embodiments described herein require the ability to refer to a document, video, song, an image of a piece of paper, electronic file, etc. by an identifier. For purposes herein, the document, video, song, piece of paper, electronic file, etc. are referred herein to as the media. An identifier used to identify the media is called a media identifier and, in one embodiment, is a string of bytes.

In one embodiment, there are several properties of the association between the media and the media identifier which are useful in the embodiments described herein: a) it is beneficial that anyone who has the media can determine an identical media identifier; b) it is beneficial that it is difficult for anyone to find two distinct pieces of media that have the same media identifier; c) it is beneficial that the media identifier does not reveal anything about the content of the media; and d) it is beneficial that any change to the media would result in a different identifier.

There are multiple ways to assign an identifier to a piece of media. For an electronic file, in one embodiment, the identifier is generated by applying a cryptographic hash function to the bytes of the file. Cryptographic hash functions are well known in the communications and security literature and have been standardized in various federal and international standards, and software toolkits.

Cryptographic hash functions meet the properties described above so well that the process of determining an identifier for a piece of media is sometimes referred to as "hashing" and the media identifier is at times referred to as a "hash," even if a different technique is used to determine the identifier. We refer to a media identifier computed with a cryptographic hash as a Content Based Identifier, or CBI. In one embodiment, a Content Based Identifier includes a prefix as well as the hash. In one embodiment, the prefix is used to identify the function used to compute the hash, e.g., "sha1" for the Secure Hash Algorithm SHA-1 hash function.

There are other ways to assign identifiers to files. For example, a server could keep a copy of every file and assign a previously unused string randomly to each new file. This method works very well for properties b, c, and d, but only meets property a if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties a and c, but not property b. While most changes to a file will result in a different simple checksum, the simplicity of the checksum means it is easy to come up with a set of strings that can be added to a file without changing the checksum. Therefore property d is not well met by the simple checksum. For some applications these properties may be less important. Also some applications may have very structured data, such that it is difficult to find two pieces of media that both have the same checksum and follow the rules of the structured data. Thus, in one embodiment, a content based identifier is not a cryptographic hash.

In one embodiment, physical pieces of paper are assigned an identifier, for example, by scanning the paper and computing a cryptographic hash of the scanned file that results. However, because of noise in the scanning process, different scans of the paper normally lead to different electronic files, and thus different identifiers. For this reason, it is sometimes convenient to affix a barcode or other machine readable identifier (e.g., a RFID tag) to a piece of paper or other physical device. Use of a machine readable ID makes it easy for anyone to determine the same identifier from different copies of a document for example; however, it is also possible to attach the same ID value to different media, so properties b and d are not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties c and d might not be held perfectly.

In one embodiment, multiple identifiers are associated with a single piece of media. For example, there could be an identifier formed by using the SHA1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

In one embodiment, different identifiers are associated with different formats of the same data. For example, the hash of a file and the hash of the ".zip" file obtained by lossless compression of the file, are different identifiers, but they are associated with the same final data.

In one embodiment, identifiers are formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions; in this case, no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. Portions of document images in PDF, JPM, or JPEG 2000 can be transmitted with a variety of resolutions, qualities, or sets of pages. XML documents may also be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and its source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, the video may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the embodiments described herein involve recording a sequence of events. The record of events is referred to as a "log" or "log-file," similar to the relationship with a log book used to record the events of a truck, ship, or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper-proof write once memory. Each record is written in order into the memory. This meets the goal of easy to add and hard to modify, but it is difficult to remotely verify that the "tamper-proof" memory has not been changed.

One method of implementing a log is to create a sequence of records where each record is made up of a message, $M_i$, and a rolling checksum, $r_i$. The rolling checksum is so named because it is computed from the current message and the previous checksum, and thus changes with each record. The rolling hash for the ith record can be computed as:

$$r_i = \text{hash}(r_{i-1} \cdot M_i)$$

where the message and the previous checksum are concatenated (represented by the "·") and provided to the hash function. The log in this case consists of a sequence of messages and checksums ($M_i$, $r_i$). In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then with high probability the subsequent checksum value recorded in the log will not correspond to the hash of the message and previous checksum. Thus modifying a record in a manner that cannot be detected would require changing the message and recomputing all subsequent checksums. If one of the checksums is copied and stored elsewhere, then any modification prior to that checksum can be detected. If a modification is made without updating the checksums, then recomputing the rolling checksums or hashes in the log reveals the error. If the rolling checksums are all changed so the log is self consistent, then the modified checksums won't match the previously externally saved checksums.

As set forth above, the hash function could be a simple checksum, but preferably is a cryptographic hash function.

This method of creating a log meets most of the goals for the log, but there are variations which provide additional benefits.

One modification is to store the hash of the message rather than the message itself in the log. Thus, if $m_i$ is defined as:

$$m_i = \text{hash}(M_i),$$

then a log can be defined as a sequence of ($m_i$, $r_i$), with $r_i$ being a checksum of only the message hash and the previous checksum:

$$r_i = \text{hash}(r_{i-1} \cdot m_i).$$

Figure 2:
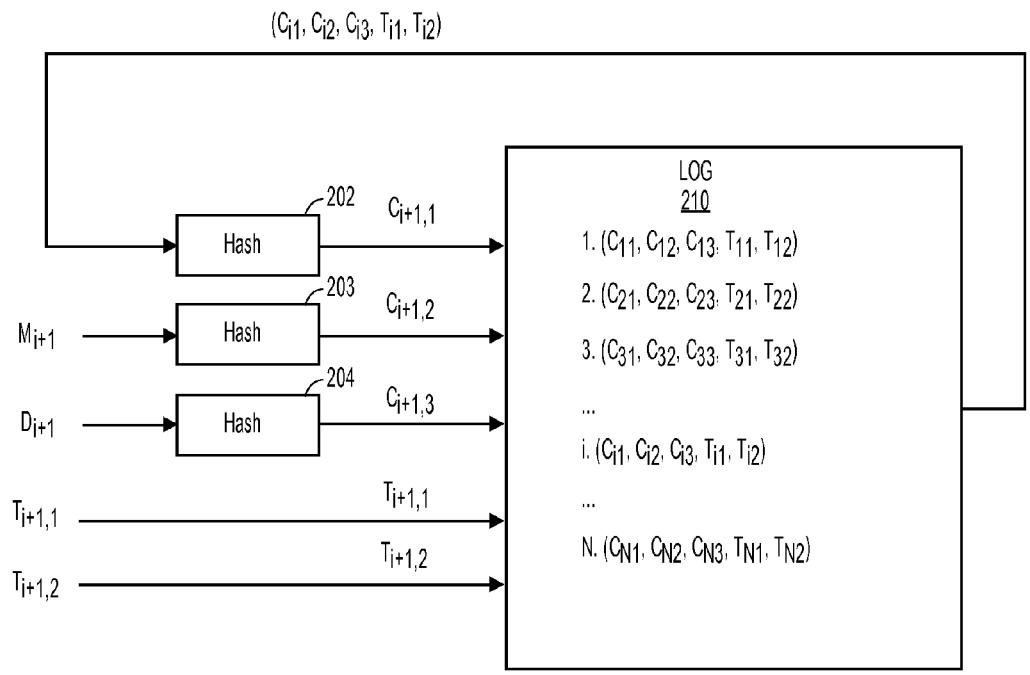
FIG. 2 illustrates generating and storing a hash of media in a log.

Another embodiment of a log is shown in FIG. 2. Referring to FIG. 2, to generate the i+1st log entry, the ith entry from log 210 is fed back to hash generator 202. Hash generator 202 utilizes a hash function to produce a Content Based Identifier, $C_{i+1,1}$ which becomes part of the new log entry. Several messages or message hashes may be added to the log at the same time. In FIG. 2 there are 4 messages shown, each of which could be a media file, metadata item, a CBI from another log, or string of bytes of any sort. Two of the messages, $M_{i+1}$, and $D_{i+1}$ are separately hashed by hash generators 203 and 204 to produce $C_{i+1,2}$ and $C_{i+1,3}$ which become part of the new log entry. Finally, messages $T_{i+1,1}$ and $T_{i+1,2}$ are stored directly in the log without hashing. A variable number of hashed messages and unhashed messages may be included. Some logs may not use any unhashed messages, or always use the same number of hashed and unhashed messages, or the unhashed messages may be of a fixed length or format to allow for easy parsing.

Storing the hash of a message rather than the message in the log has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without revealing the sensitive customer information.

In some embodiments, more than one message $M_i$, $M_j$, $M_k$, etc. might be appended to the log as a single atomic transaction. A single hash function can be applied to the entire record with the message hashes arranged in a chosen order, producing the checksum $r_i$.

In one embodiment, the record and rolling checksum are structured slightly differently. In this case, each entry in the log is considered as a piece of media, and a cryptographic hash based identifier for the previous media is stored in the log along with the hash of the current message. Thus, a log consists of a sequence of $(p_i, m_i)$ where mi=hash $(M_i)$, and $p_i$=hash$(p_{i-1}, m_{i-1})$.

In some cases, it is desirable to have a log with more information than solely the hash of the message. For example, it is often useful to have the time stored in the log or the type of information of the log entry stored in the published log. This makes it easier to search the log for specific records. Thus, then in one embodiment, if the information in a record that is readable is defined as the "plain text", called $t_i$, the log consists of a sequence of $(t_i, m_i, r_i)$, and each checksum, $r_i$, is computed as:

$$r_i = \text{hash}(r_{i-i} \cdot t_i \cdot m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.

---

Author: gormish
SHA1: 1bff5d8cda307b5f3f3757cb25588a54cfb01ce0
Content-Length: 567
567 bytes of DATA

---

In one embodiment, this type of format is used for http and email. Thus, several well-known headers have already been defined for those applications and could be used in a log.

Different keys can be used for different encrypted entries or different types of encrypted entries in the log. For example, all log entry publication information might be encrypted with one key, all classification values with a different key. If the log is associated with a single document and that document is encrypted, then the entries in the log might be encrypted with the same key as used for the document. That way, anyone with access to the document is also granted access to the information in the log.

Another method of implementing logs is through content based identifiers (CBIs). In one embodiment, a CBI is a sequence of bytes computed as a one way hash of a piece of media, representing a document, image, scanned piece of paper, etc. The CBI consists of two parts, a hash type used to compute the hash value and the hash value itself. In one embodiment, the hash type is defined by a five byte string indicating a hash type of md5, sha1, sha256, or Null, though other types of hashes may be utilized.

Log entries are made up of two or more CBIs, where the first CBI is either an initialization value or a reference to a previous log entry. The second and subsequent CBIs are content, such as other log entries, data, arbitrary strings of bytes, etc. An exemplary grammar for a log entry is:

---

```
entry = prev-ref 1*("-" content-ref)
prev-ref = cbi
content-ref = cbi
cbi = md5cbi | sha1cbi | sha256cbi | nullcbi
sha1cbi = "sha1." 40LOWHEX
md5cbi = "md5x." 32LOWHEX
sha256cbi = "s256." 64LOWHEX
nullcbi = "null."
LOWHEX = "a" | "b" | "c" | "d" | "e" | "f" | DIGIT
DIGIT    = <any US-ASCII digit "0" . . . "9">
entry-line = "Entry:" SP entry CRLF
CRLF = CR LF
CR       = <US-ASCII CR, carriage return (13)>
LF       = <US-ASCII LF, linefeed (10)>
log-chain = *entry-line
```

---

An entry line is utilized to store CBI log entries in a text file, or other string based data structure, and a log chain is a sequence of log entries where every entry beyond the first contains the hash of the previous entry. Thus, in one embodiment, a sequence of syntactically correct log entries where any entry other than the last does not contain the correct hash of the previous log entry is an invalid log chain. One embodiment of verification of a log chain is described in greater detail below. An exemplary log chain is:

```
Entry: null.-sha1.a72bfa0145c55eeb34400fa28489d3023dcb34e4
Entry: sha1.940f74e519e28fb9e5578291339251aea295fa2d-sha1.-
a9993e364706816aba3e25717850c26c9cd0d89d
Entry: sha1.91f09dd09691e697cc5d9dba7515bc1a92177fa4-sha1.
84983e441c3bd26ebaae4aa1f95129e5e54670f1
```

The exemplary log chain file above includes three complete log entries.

While log entries may be stored in a file, in one embodiment, log entries are also stored as records in a database. For example, a shared document scanner is connected to a network, scanned documents are created as PDF files on the scanner, and distributed somewhere on the network, depending on user input. The scanner keeps track of where documents are initially distributed, and the date of capture and the cryptographic hash of the PDF file containing the scan. The scanner does not store the contents of all files (scans), but does store the hash of all files. In one embodiment, the scanner stores log chains with verification data about the scans in a database, such as an SQL database table. In another embodiment, the log chain provides verification information about the scans and the records in database tables. Although the example above discussed a scanner utilizing log chains, mail servers, multi-function printers, etc. may also be configured to create and log CBI entries.

In one embodiment, as discussed above, a log supports different multiple rolling hashes or different types of hashes, i.e. hashes computed with different cryptographic hash functions. For example, in one embodiment, the value $r_i$ is as follows:

$$r_i = \text{hash}(r_{i-1}, t_i, m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, s_i)$$

where $r_i$ is computed as:

$$r_i = \text{SHA1}(r_{i-1}, t_i, m_i)$$

and $s_i$ is computed as:

$$s_i = \text{SHA256}(s_{i-1}, t_i, m_i)$$

As with the single rolling checksum case, the sequence of $r_i$, and $s_i$ can started by setting $r_0$ and $s_0$ to a preset initialization value, or to the hash of some media. This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes ($M_i$, $r_i$), with $r_i = \text{SHA1}(r_{i-1}, Mi)$, with i between 1 and N. New messages can be added to the log which consists of the old messages and a new rolling hash computed with a different hash function. Thus, message N+1 could be the first message concatenated with a rolling checksum computed using a new hash function. In general:

$$M_{N+1} = M_i, s_i$$

where $$s_i = \text{SHA256}(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = \text{SHA256}(s_{i-1}, t_i, m_i, r_i)$$

or $$s_i = \text{SHA256}(r_{i-1}, s_{i-1}, t_i, m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log does not have too many entries.

In some cases, the log may become very long, usually because a record of a frequent event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the computational methods of insuring that events occur in sequence, in one embodiment, a physical tamper proof device may be used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Publishing Log Entries

Because it is relatively easy to modify a single log in a manner that is not detectable upon examination of that log in isolation, in one embodiment, information is exchanged between logs in such a way that modification of the entries in one log can be detected by examining another log. It is important to store information in the second log that depends on a range of log entries in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records contain more bits than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called publishing or entangling because after storing information from one log in another, all future rolling checksums in the second log depend on the information in the first log.

In one embodiment, one log is being used to store pairs of message hashes and rolling hashes, i.e. $(m_i, r_i)$, and the rolling hash from the first log is used as the message hash for an entry in a second log. Thus, all rolling hashes after that entry in the second log depend on the rolling hash from the first log.

While this is the simplest embodiment, the limited amount of information stored when publishing can make it difficult to determine what the nature of the hash is. Thus, in one embodiment, additional information is included in the log entry used for publication. For example, those logs using a type value can set the type to indicate that the data is not a "regular message" but an "external checksum." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
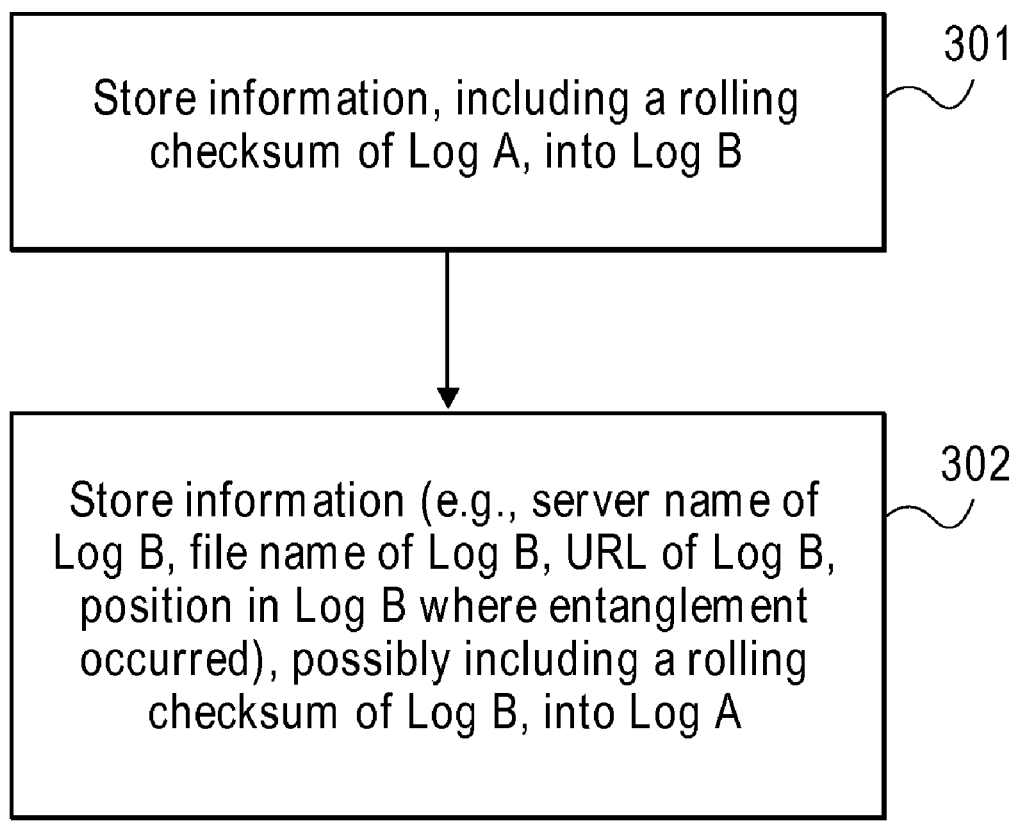
FIG. 3 is a flow diagram of one embodiment of a process for publishing information from one log to another.

In many cases, it is desirable to determine which logs contain information from a first log. In order to facilitate this, information can be stored in both logs when checksums are published. FIG. 3 is a flow diagram of one embodiment of a process for publishing or entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored in the log, the publication is both from log B to log A and from log A to log B.

Verification Procedure

In many situations, it is necessary to determine if a log has been modified since it was created. This is best done by software, computer systems, and people independent from the log generation hardware, software, and people.

Figure 10:
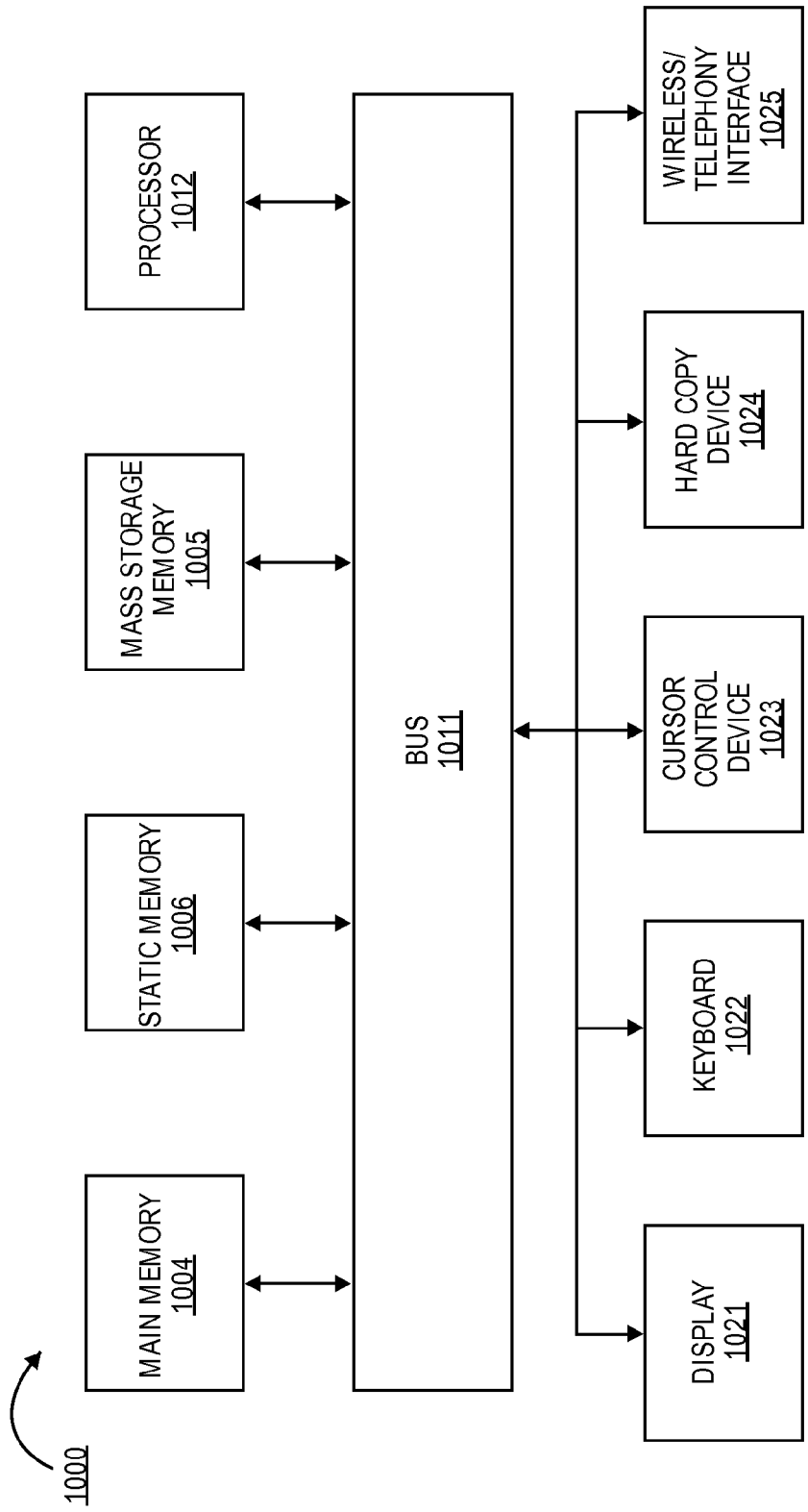
FIG. 10 is a block diagram of a computer system that may perform one or more of the operations described herein.

In one embodiment, to determine if a log is self consistent, verification software such as in a computer system of FIG. 10 or a dedicated machine recomputes the rolling hash for each entry in the log. If the rolling hash computed by the verification software matches the rolling hash stored in the log, then the entry associated with the rolling hash has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is published in or entangled with another log. The entries in the second log must be self consistent before and after the published entry. If Log A has entries which are published to Log B, Log A and Log B may be referred to as being entangled.

An Example of a Hash Chain Detection Procedure

Figure 4:
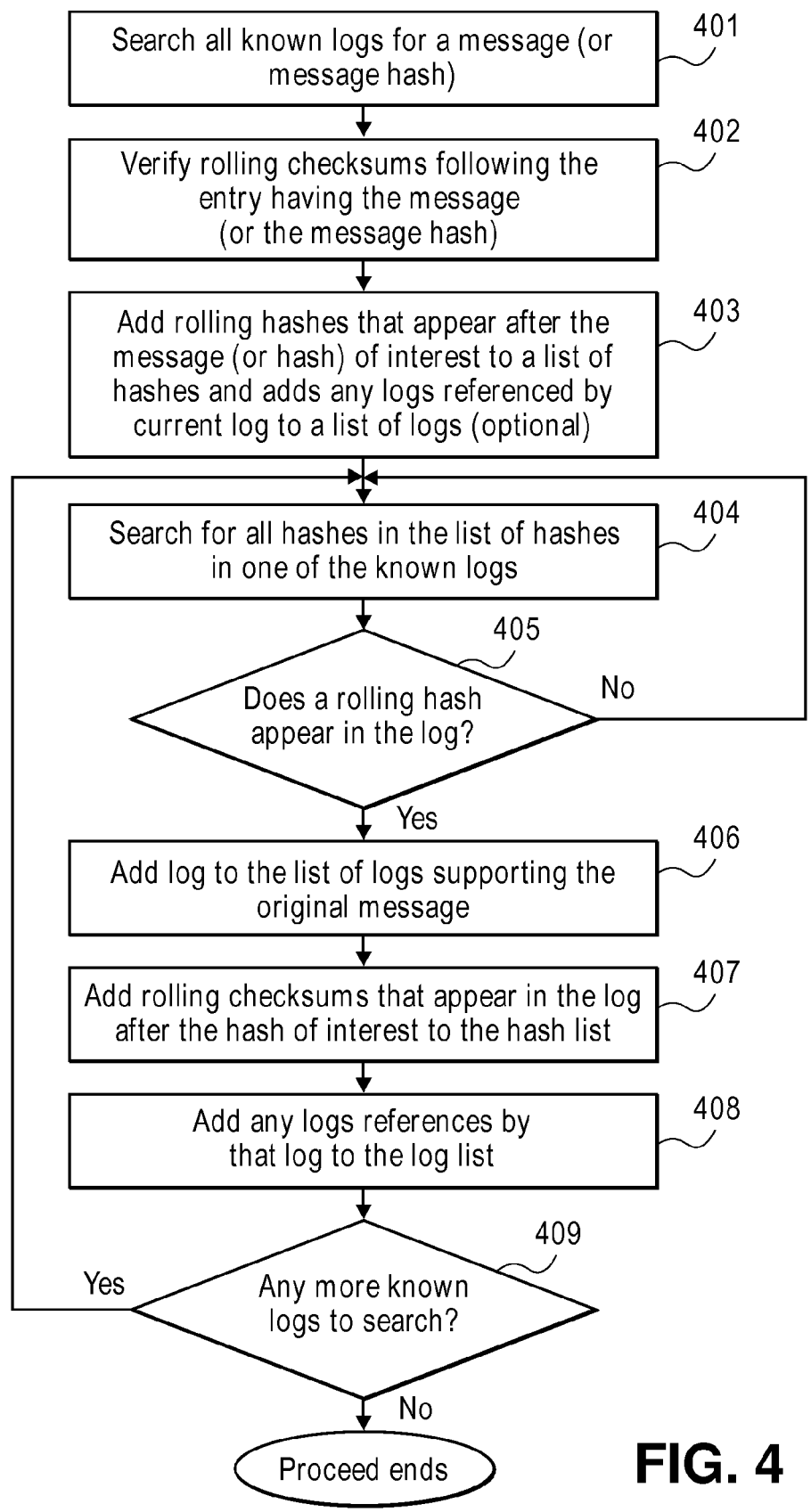
FIG. 4 is a flow diagram of one embodiment of a process for performing entry verification.

If a third party wishes to determine the validity of a message stored in a log some time after the entry was made and rolling checksums were published to other logs, hash chain detection allows all servers which have entries that are consistent with the message to be determined. FIG. 4 is a flow diagram of one embodiment of a process for performing entry verification. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that has not been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log to the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then confidence in verification of the logs will be increased, because some of the logs used for verification are outside the control of the initial entity. This benefit of publishing to different devices means that the logs should be able to store addresses of entangled logs that cross company and device boundaries. One way to do this is to use a URL to identify a log.

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier. Other search procedures can be used, for example, starting the search with a trusted server and looking for entries that have been published to that server.

Authentication Via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system. In a subsequent interaction, the system could ask for the rolling hash used to make the deposit. If more security is desired, in one embodiment, the system asks for information about that rolling hash (e.g., the hash of that rolling hash and a challenge string). The system could ask for several pieces of information about a previous interaction that could only be answered by someone in possession of the log.

In one embodiment, the term 'rolling checksum' is used herein to mean a string of bytes computed by a function, such as a cryptographic hash, on previous portions of a log. The portions of the log used in the computation vary from application to application. In one embodiment, a Content Based Identifier, or CBI, is used in the same way when the CBI is computed for a portion of a log, or computed for media (e.g., a digital photograph) that is not part of a log. In one embodiment, a hash chain is used to refer to a sequence of entries where each entry contains a rolling checksum, and all of the data in the hash chain before the final rolling checksum is part of at least one of the rolling checksums.

In one embodiment, verifying a rolling check sum or CBI includes operating the function used for the rolling checksum or CBI on the appropriate data, and comparing the computed result with the stored value. If the computed value and the stored value are the same, the rolling checksum is valid, consistent, verified, etc. In one embodiment, verifying a hash chain is used to mean verifying a sequence of rolling checksums or CBIs in the hash chain and comparing the computed results with the values stored in the hash chain. In one embodiment, a hash chain, where all of these computations produce results equivalent to the values stored in the hash chain, is said to be consistent. A consistent hash chain where the final entry is stored by a trusted entity is said to be verified. Furthermore, a hash chain where even one computation fails to produce the value stored in the hash chain is said to fail verification, be inconsistent, or be invalid.

In one embodiment, a hash chain begins with an item of media, and then a sequence of log entries. In this case, the CBI for the media must be in the first entry in the hash chain. Thus, verification includes computing the CBI for the media and comparing the computed value with the value in the first entry. In one embodiment, an item of media is verified by having a hash chain beginning with the media and ending at a log entry from a trusted entity. A properly formed log is a hash chain. In one embodiment, a log is a local collection of log entries with each rolling checksum in the same position in the entry.

In one embodiment, hash chains may be created from log entries stored in multiple locations and part of multiple logs. Logs may be created for a variety of reasons. In one embodiment, when a log contains information associated with a particular media, it may be referred to as a document log. In one embodiment, when a log is associated with a process, server, or collection of media, it may be referred to as a device log. The terms device log and document log may be used to imply typical usage, but do not limit the application to only one type of information.

Risk Analysis of Log Entry Entanglement

Entanglement of logs via publication of log entries increases the trust-worthiness of logs, log entries, collections of logs, etc., as well as the associated document, media file, metadata, etc. However, how trust-worthy certain logs are, given criteria such as publication procedure, was unknown and not utilized. In one embodiment, the risk associated with verification failure in a system of published log entries is estimated. Furthermore, once verification failure risk, and the approach to estimating verification failure risk are known, users may be enabled to choose publication protocols for log protection given certain constraints such as value of verifiability of log entries, band-width, disk space, etc.

Document Logs

One motivation for logging technologies is to provide secure verification of records for the purpose of auditing. A record is a piece of data. In one embodiment, the piece of data has a record ID which is often a content based identifier and a document log which is a list of items relating to the record. As discussed above, an entry may consist of a hash of the previous entry concatenated with the hash value of some message or metadata. Inclusion of the hash or CBI of the previous entry means that consecutive list entries are linked together via sequential hashing or rolling checksums. In order to increase "trust", some kind of evidence is collected from a "third party", by sending a rolling checksum or CBI for one to a log entry to another log and including the sent value in that third-party log via computing a new rolling checksum for the receiving log. This publication from one log to another is called.

In one embodiment, a network consist of N logs $d_1 \ldots d_N$. Each log $d_m$ consist of a list of log entries, where a log entry at position i in the list is defined as $l_i(d_m) = (\lambda_{i,1}(d_m), \lambda_{i,2}(d_m))$, where $\lambda_{i,1}$ contains the CBI of the previous log entry, $\lambda_{i,1}(d_m) = h(l_{i-1}(d_m))$, with h(•) being a one-way cryptographic hash function, and $\lambda_{i,2}(d_m)$ contains a piece of data $\delta_i$. For an index pair (i, j) with i<j, for purposes herein the log entry $l_i(d_m)$ existed before $l_j(d_m)$.

If a log entry in $d_m$ is published to another log $d_n$, the log entry at destination $d_n$ receiving the CBI is denoted herein by $l_j(d_n)$, where j is the list-index of the received entry in device log $d_n$. Where CBIs are sent out during publication, the relationship between two values $l_i(d_m)$ and $l_j(d_n) = (\lambda_{1,j}(d_n), \lambda_{2,j}(d_n))$ is: $\lambda_{2,j}(d_n) = l_i(d_m)$ and $\lambda_{1,j}(d_n) = h(l_{j-1}(d_n))$.

This relationship together with the hash chaining inside a log are used in one embodiment during verification to check whether an entry may have been altered. Given $l_{i1}(d_{n1})=(\lambda_{1,i1}(d_{n1}), \lambda_{2,i1}(d_{n1}))$ and $l_{i2}(d_{n2})=(\lambda_{1,i2}(d_{n2}), \lambda_{2,i2}(d_{n2}))$, a check is made to determine whether the hash of $l_{i1}(d_{n1})$ yields $\lambda_{1,i2}(d_{n2})$. If that condition is true, then $l_{i1}(d_{n1})$ is verified by its successor $l_{i2}(d_{n2})$.

A log entry $l_i(d_m)$ can be verified conditioned on another log entry $l_j(d_n)$ when the following two conditions hold. First, there exists a chain of log entries $\{l_{i1}(d_{n1}), \ldots, l_{iK}(d_{nK})\}$ with $l_{i1}(d_{n1})=l_i(d_m)$, $l_{iK}(d_{nK})=l_j(d_n)$ and $l_{ik}(d_{nk})$ is published to $l_{ik+1}(d_{nk+1})$ for $k=1, \ldots, K-1$ Second, the verification procedure for verifying a given entry by its successor is successfully applied to each entry of the chain associated with the log entry.

Figure 5:
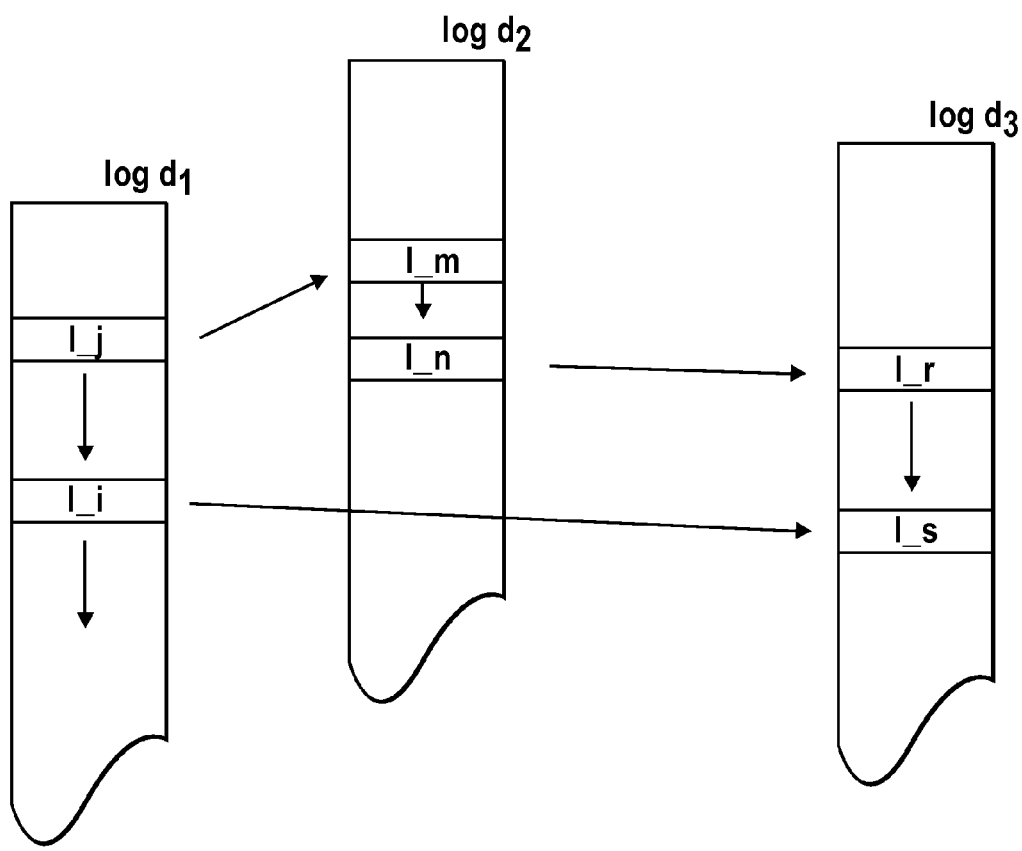
FIG. 5 illustrates publication between three logs.

FIG. 5 shows an example publication between three logs. Referring to FIG. 5, log entry $l_j(d_1)$ is published to device log $d_2$ via the entry $l_m(d_2)$, and $l_m(d_2)$ is entangled with device log $d_3$ via $l_r(d_3)$. Log entry $l_i(d_1)$ is published to log $d_3$ via the entry $l_s(d_3)$. Thus, examples of hash chains are $\{l_j(d_1), l_m(d_2), l_n(d_2), l_r(d_3)\}$ and $\{l_i(d_1), l_s(d_3)\}$, where the lists are skipping some entries within a single log.

In one embodiment, two kinds of publication are used. A first type of publication is inside a given log via the regular hash chain, e.g. the connection between $l_m(d_2)$ and $l_n(d_2)$, referred to herein as local reference. A second type of publication is between two different logs, such as between $d_1$ and $d_2$ via entries $l_j(d_1)$ and $l_m(d_2)$, referred to herein as external publication.

Publication Graphs

In one embodiment, log entries and their publication relationships may be modeled as directed graphs. Let the vertex set V be the set of all log entries in the network, $V=\{l_i(d_m)\}$. A directed edge is defined between two elements $l_i(d_m), l_j(d_n)$ of V if there is an publication from $l_i(d_m)$ to $l_j(d_n)$ with source $l_i(d_m)$ and destination $l_j(d_n)$. The publication from $l_i(d_m)$ to $l_j(d_n)$ for m not equal to n, represents an external publication. When $d_m=d_n$ and $j=i+1$, the publication is a local reference.

The directed graph $G=(V, E)$ is called a publication graph. In one embodiment, a publication graph has the following properties:

G=(V, E) is a directed acyclic graph since the method of connecting two vertices is based on a one-way hash function.

The in-degree is $\leq 2$. The in-degree is 1 if an entry is only locally published, but not externally published, and 2 if an entry is published locally and externally.

The out-degree is equal to the 1+number of copies of an entry that is sent out for entanglement. In one embodiment, only one copy per entry is considered, i.e. the out-degree is bounded by 2.

An hash chain with endpoints $l_i(d_m)$ and $l_j(d_n)$ in a log (or multiple logs) can be modeled as a path in the publication graph between vertices $l_i(d_m)$ and $l_j(d_n)$.

Probability of Log Failure in Graph Model

Every log entry l has a probability of being faulty, i.e. the entry may not be readable due to disk failure or is/was re-written during an attack. This probability is denoted herein by p(l). Given a hash chain, verification of the initial entry in a chain conditioned on the last entry in the chain has a probabilistic interpretation. That is, a log entry $l_i(d_m)$ can be verified conditioned on another log entry $l_j(d_n)$ with a certain probability, as discussed below in greater detail.

In one embodiment, the probability of verification depends on the publication graph, the individual failure probabilities p(l), and the dependency structure between failure probabilities. In one embodiment, all p(l) are presumed to be independent. However, in other embodiments, there are non-zero correlations between certain p(l), e.g. all failure probabilities of entries that belong to the same log. In order to simplify the notations used herein, and to avoid obscuring the present invention, l is used to denote a generic log entry. An index and association with a log is added when required by the context.

A log entry $l_i(d_m)$ can be verified conditioned on a log entry $l_j(d_n)$ if there exist a path $\Gamma(l_i(d_m), l_j(d_n))$ between $l_i(d_m)$ and $l_j(d_n)$ in the publication graph, and all the log entries along the path are not faulty. When those two conditions are satisfied, verification can be successfully applied. In one embodiment, we consider the two events that a log entry l can be verified conditioned on a log entry $l_j(d_n)$, denoted by $X_{l_j(d_n)}$ and the event that a path $\Gamma$ between l and $l_j(d_n)$ in G contains only non-faulty entries. Then:

$$P(l_i(d_m) \in X_{l_j(d_n)}) = P(\text{there exists a path } \Gamma(l_i(d_m), l_j(d_m)) \in Y) \quad (1)$$

Trusted Logs

In one embodiment, a publication network includes one or more logs that are trusted logs. Trusted logs could be owned by a company (e.g., an auditing company), an office (e.g., a patent office), a service (e.g., a time-stamping service), or any other institution offering some guarantees as to the integrity of their logs. Thus, a trusted log is considered to be a good choice to publish to for verification purposes.

In other embodiments, the trusted log may not be known in advance. Several log entries may be made and published to other logs, and then at a later date, a trusted log is specified (e.g., an entity may specify that log $L_i$ from logs $L_1 \ldots L_n$ is a trusted log). At that point it is too late to make new publications to the trusted log to establish that some document existed in the past. To decide if the entry should be trusted there must already be a hash chain from the trusted log to the log entry of interest. Thus, some methods described herein discuss publishing to a trusted log, but in fact publish to multiple logs with the same frequency expecting one will be chosen as the trusted log at a later time. If any of the logs treated the same way turns out to be the trusted log, the analysis applies.

It is also possible that a trusted log, perhaps run by an accounting firm or government agency, may cease to exist at a later date. If verification is desired at a point in time after the termination of these logs, publication to other logs that are still in operation is necessary for verification.

In the context of the models discussed above, verification with trusted logs means that a log entry can be verified if there exists a hash chain to a trusted log, and the verification procedure can be successfully applied to all entries along the chain. Given a trusted log $d_{m*}$, X is defined as the event that a log entry l can be verified conditioned on any entry in a trusted log, and $\Gamma(l_i(d_m))=\Gamma(l_i(d_m), l_j(d_{m*}))$. With these definitions, the following probability is obtained:

$$P(l_i(d_m) \in X) = P(\text{there exists a path } \Gamma(l_i(d_m)) \in Y) \quad (2)$$

A trust measure $T(d_m)$ can then be assigned to a log $d_m$ by considering verification probabilities for all the entries in that log. Choices for a trust measure may be:

$$\min_i P(l_i(d_m) \in X), \text{ or}$$

$$\frac{1}{\text{length of } d_m} \sum_i P(l_i(d_m) \in X)$$

In one embodiment, for a generic publication network, more than one path may lead from a log entry to a trusted log. Assuming that n different paths lead from an entry l to a trusted log, then the probability of verifying l as defined in Eq. (2) above is the probability of at least one verifying at least one path:

$$P(l_i(d_m) \in X) = P(\Gamma_1(l) \in Y \cup \Gamma_2(l) \in Y \cup \ldots \Gamma_n(l) \in Y) \quad (3)$$

Then, for n=2:

$$P(\Gamma_1(l) \in Y \cup \Gamma_2(l) \in Y) = P(\Gamma_1(l) \in Y) + P(\Gamma_2(l) \in Y) - P(\Gamma_1(l) \in Y \cap \Gamma_2(l) \in Y) \quad (4)$$

$$= P(\Gamma_1(l) \in Y) + P(\Gamma_2(l) \in Y) - P([\Gamma_1(l) \cup \Gamma_2(l)] \in Y) \quad (5)$$

This procedure can be applied successively to obtain the result for n>2. Where the events of a log entry being faulty are independent for different log entries, i.e., $P(\Gamma(l) \in Y) = \Pi_{l \in \Gamma}(1-p(l))$, the formula in Eq. (4) results in $$P(\Gamma_1(l) \in Y \cup \Gamma_2(l) \in Y) = \Pi_{l \in \Gamma_1}(1-p(l)) + \Pi_{l \in \Gamma_2}(1-p(l)) - \Pi_{l \in \Gamma_2}(1-p(l)) \quad (6)$$

Since $0 \leq p(l) \leq 1$, it follows that:

$$P(\Gamma_1(l) \in Y \cup \Gamma_2(l) \in Y) \leq \max(\Pi_{l \in \Gamma_1}(1-p(l)), \Pi_{l \in \Gamma_2}(1-p(l))) \quad (7)$$

with strict inequality in case the two paths are distinct.

Risk Scenarios

Risk of verification failure in the publication scenario, associated with verification of a log entry, is defined in one embodiment as:

risk of verification failure=(probability of verification failure of a log entry)·(loss caused by verification failure)

Given a set of logs and one designated trusted log, publication is performed in such a way that every T-th log entry in a log is entangled with another log. The risk associated with verification of a specific log entry results in a sum of the value loss coming from blocks of entries between two successive publications weighted by certain failure probabilities. Those probabilities depend on the publication structure attached to the externally published entries contained in a block of entries. If the value of a log entry l is denoted by v(l), the associated risk of other logs is:

$$R(l_{iT}) = \sum_{m=1}^{i} \left[ \prod_{q=0}^{m-1} \hat{p}(l_{(i-1)T}) \right] \cdot \sum_{k=(i-m+1)T}^{(i-m)T-1} v(l_k) \quad (8)$$

where $\hat{p}(l_{jT}) = P(l_{jT} \in \overline{X} | l_{(j-1)T} \in X, \ldots, l_{iT} \in X)$ for j<i and $\hat{p}(l_{jT}) = \hat{p}(l_{iT})$ for i=j.

Risk for entries that are only referenced locally and do not have external publication, i.e., $l_{iT+j}, 0 < j < T$, is:

$$R(l_{iT+j}) = \left(1 - (1-\hat{p}(l_{(i+1)T})) \prod_{q=1}^{T-j} (1-p(l_{(i+1)T-q}))\right) \cdot \sum_{k=iT+j}^{iT+1} v(l_k) +$$

$$\sum_{m=1}^{i} \left[ \prod_{q=0}^{m-1} \hat{p}(l_{(i-q)T}) \right] \cdot \sum_{k=(i-1+1)T}^{(i-m)T-1} v(l_k)$$

Publication to Trusted Logs

As discussed above, trusted logs are logs, or logging services, that are owned and/or operated by known sources that offer some form of guarantees as to log integrity. Examples of such known sources are companies, an office, a service, etc. In one embodiment, because the trusted log is known, operated by a third party, independent, etc., publication to trusted logs may therefore be considered good choices to condition other log entries on during verification. As discussed below, three exemplary publication scenarios, or publication protocols, are discussed and the risk of verification failure determined. However, other publication protocols exist, their associated risks similarly derived, and applied to protocol selection, consistent with the discussion below.

Direct Publication to Trusted Logs

In one embodiment, publication is performed so that every T-th log entry in a log is published directly to a trusted log. No other external publication, i.e., publication to logs that are not considered to be trusted, takes place with the log. Since direct publication with a trusted log is performed, the probability $\hat{p}(l)$ is equal to the individual failure probability p(l), and the risk of log failure is:

$$R_1(l_{iT}) = \sum_{m=1}^{i} \left[ \prod_{q=0}^{m-1} p(l_{(i-q)T}) \right] \cdot \sum_{k=(i-m+1)T}^{(i-m)T-1} v(l_k) \quad (9)$$

In one embodiment, if all values are constant, i.e. $v(l_k)=c$ for all k, then risk $R_1$ is:

$$R_1(l_{iT}) = T \cdot c \cdot \sum_{m=1}^{i} \left[ \prod_{q=0}^{m-1} p(l_{(i-q)T}) \right] \quad (10)$$

Furthermore, if all the failure probabilities p(l) are equal, i.e. $p(l_{iT})=p_c$ for all i, then the risk of verification failure is:

$$R_1(l_{iT}) = T \cdot c \cdot p_c \frac{1-p_c^i}{1-p_c} \quad (11)$$

In one embodiment, for very small values of $p_c$, the risk is nearly constant and can be further approximated by T·c.

In one embodiment, for a specific log entry $l_{iT+j}, 0 < j < T$ and the same conditions discussed above with respect to Eq. (11), the risk is:

$$R_1(l_{iT+j}) = j \cdot c \cdot \left(1 - (1-p_c)^{T-j+1} + T \cdot c \cdot p_c \frac{1-p_c^i}{1-p_c}\right) \quad (12)$$

For very small values of $p_c$ the first term in the equation is somewhat parabolic in shape, whereas the second part of the equation is nearly constant and can be approximated by T·c.

Round Robin Publication

In one embodiment, publication may occur in a round robin fashion. That is, for a given log, publication is performed every T-th log entry with one of R designated logs. The order in which a log is chosen for entanglement is sequential and repeating. For example, the first publication happens with receiving log $d_{n1}$, the second entanglement with log $d_{n2}$, etc. After the R-th publication with $d_{nR}$, the (R+1)-th publication occurs again with receiving log $d_{n1}$, the (R+2)-th publication with $d_{n2}$, etc.

In one embodiment, and for purposes of verification, one out of the R receiving logs is a trusted log. In one embodiment, that trusted log is determined after the publication has been performed. In order to determine the probability of verification of a log entry l, the probability as stated in Eq. (3) is determined. The paths r that are considered may have a length greater than one because l does not necessarily publish directly to the trusted log. For the same reason, the probability of not being able to verify entry l is in general different from the failure probability p(l). Thus, just as in the case of direct publication to trusted logs, the probability of not being able to verify is equal to the failure probability.

In one embodiment, the risk $R_2$ of failure for round robin publication is bounded by:

$$R_2(l_{iT}) \leq T \cdot c \cdot p_{max} \cdot \frac{1-(p_{max})^{i-\lfloor \frac{i}{R} \rfloor R}}{1-p_{max}} + T \cdot R \cdot c \cdot p^* \cdot \frac{1-(p^*)^{\lfloor \frac{i}{R} \rfloor}}{1-p^*} \quad (13)$$

where $p_{max} = \max_j \{\hat{p}(l_{jT})\}$ and $p^* = \max_j \{\hat{p}(l_{jRT}) \cdot \hat{p}(1_{(jRT+1)T}) \cdots \hat{p}(1_{(jR+R-1)T})\}$.

Random Publication

In one embodiment, for a given log, publication is performed every T-th log entry with one of R designated logs, and the order in which receiving logs are chosen is random. In one embodiment, receiving logs are chosen from a uniform distribution of receiving logs. For verification purposes, one out of the R receiving logs is a trusted log. In one embodiment, for random publication to a trusted log, risk for $\hat{p}(l_{(i-q)T})$ can be estimated from Eq. (8) discussed above, via the equation's expected value:

$$E[\hat{p}(l_{(i-q)T})] \approx \frac{R-1}{R^2} \left[ \frac{1-\left(\frac{R-1}{R}\right)^{J_{i,q}}}{1-\frac{R-1}{R}} - q_c^{S+1} \cdot \frac{1-\left(\frac{R-1}{R}q_c^S\right)^{J_{i,q}}}{1-\frac{R-1}{R}q_c^S} \right] \quad (14)$$

where $q_c = 1 - p_c$, $1 \leq S \leq T$, and $$J_{i,q} = \frac{M}{T} - (i-q),$$

where M is the total number of entries in a log.

The estimation of $\hat{p}$ above in Eq. (14) involves an estimation of its expected value since a random uniform distribution is used for one out of R possible receiving logs. Given a set of possible values for $\hat{p}$ the probability, the probability that those values occur is determined. In one embodiment, the probability of reaching the trusted log via visiting j logs as:

$$\tilde{p}_j(l_{(i-q)T}) = \begin{cases} \text{probability of reaching the trusted,} & 1 \leq j \leq J_{i,q} \\ \text{log in } j \text{ entanglemnt steps,} & \\ 0 & j = 0 \end{cases} \quad (15)$$

Then, since the choice of receiver is made by drawing from a random distribution, $\tilde{p}$ can be calculated as:

$$\tilde{p}_j(l_{(i-q)T}) = \begin{cases} \frac{1}{R} \cdot \left(\frac{R-1}{R}\right)^{j-1}, & 1 \leq j \leq J_{i,q} \\ 0, & j = 0 \end{cases} \quad (16)$$

In one embodiment, the value of the probability for failed verification for publication to the log via visiting j logs is estimated as $(1-q_c^{(j-1)S+1})$ with $q_c=(1-p_c)$ and where $1 \leq S \leq T$. With these results, the estimation of Eq. 14 is obtained, and the risk for random publication with R receiving logs and a trusted log is:

$$R_3(l_{iT}) \approx \Sigma_{m=1}^{i} [\Pi_{q=0}^{m-1} E[\hat{p}(l_{(i-q)T})]] \cdot \Sigma_{k=(i-m+1)T}^{(i-m)T-1} v(l_k) \quad (17)$$

A difference between round robin publication and random publication with trusted logs is that round robin publication ensures publication directly with a trusted log at regular intervals. Furthermore, whereas random publication ensures publication with a trusted log only with a certain probability less than one, depending on the number of receiving logs, round robin publication may guarantee that a trusted log will be reached in a very limited number of steps.

Management of Verification Risk Failure

Given a collection of logs associated via hash chains, an individual log entry of a certain log may be published to another log via the mechanisms discussed above. Publishing a log entry to other logs is intended to increase the trust-worthiness of a specific log entry or a collection of log entries, and therefore the trust-worthiness of the associated logged documents and metadata. As discussed above, the probability of verification failure in a system of published log entries can be estimated for a direct publication protocol, a round robin protocol, and a random publishing protocol. Thus, a concrete measure of the trust-worthiness (i.e., how likely a log will/will not be successfully verified) of log entries, and an associated risk of verification failure, is described.

Since the probability of verification failure can be determined given publishing scenarios, log networks, log entries, etc., the estimated risk associated with verification failure can be utilized. In one embodiment, given constrains, such as the value of verifiability of log entries, band-width constrains, disk space, cost to entangle with a trusted log, frequency of entanglement, etc., a publishing protocol that satisfies those constraints can be determined. Thus, users are enabled to define constraints and then receive a determination of the best fit publishing protocol, or a satisfactory publication protocol, to protect their documents and metadata given those constraints.

As discussed above, the risk of verification failure for a specific log entry is defined, in one embodiment, as the probability of verification failure of a log entry times the loss caused by verification failure. The loss caused by verification failure is a value received from a user or system. In one embodiment, the loss is given an equal value to each entry in a log, however specific log entries can be individually valued. Therefore, given an acceptable risk level, a set of publication protocols, and information about publication, storage costs, number of logs, value(s) assigned to particular documents, failure probabilities, history of other logs' actions, etc., the risk and cost for the publication protocol can be determined. A publication protocol can then be selected based on the results of the analysis, and logs implemented according to the publication protocol.

Figure 6:
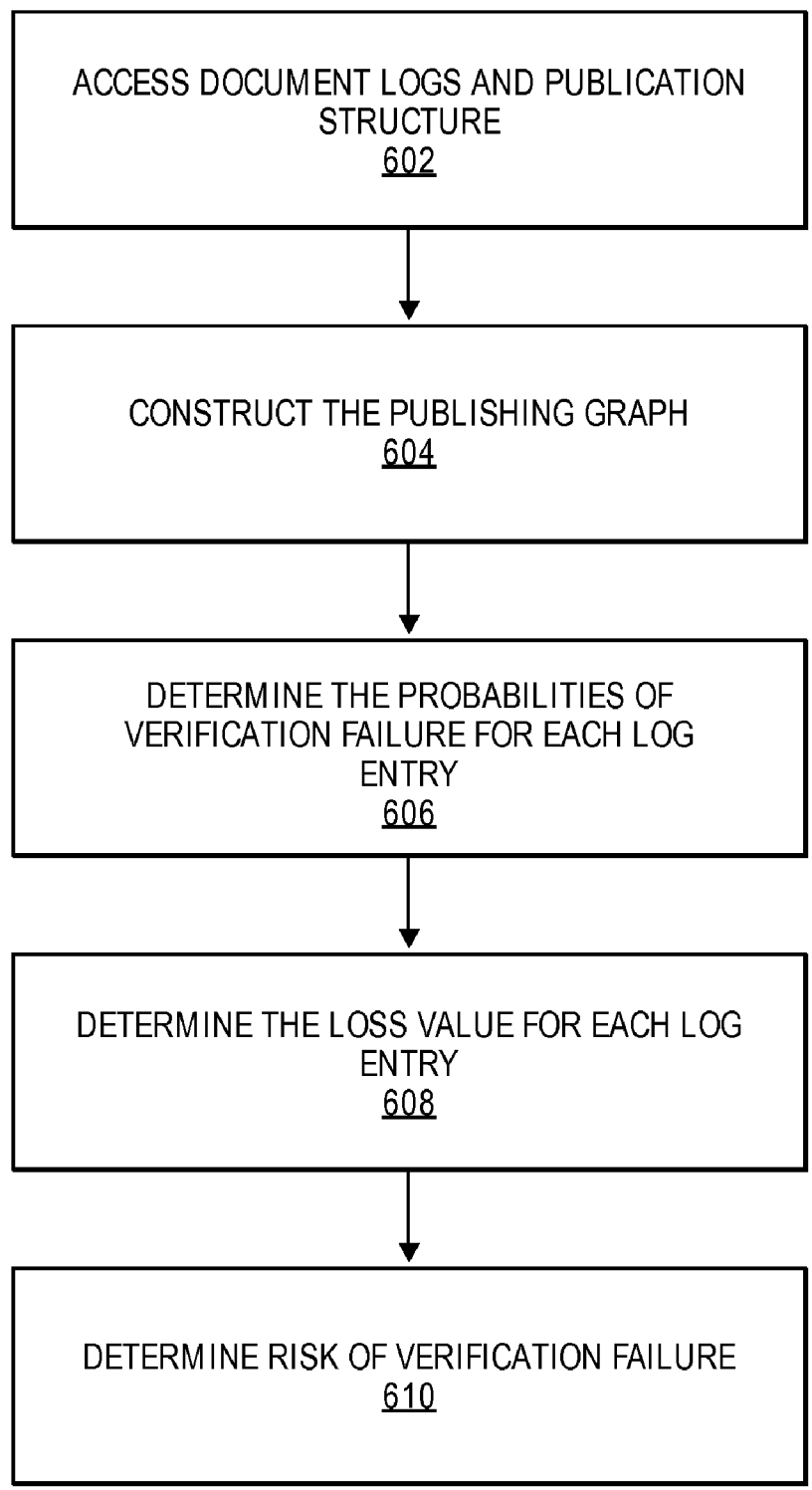
FIG. 6 is a flow diagram of one embodiment of a process for risk estimation.

FIG. 6 is a flow diagram of one embodiment of risk estimation. The process is performed by processing logic that may comprise hardware (circuitry, dedicated logic, etc.), software (such as is run on a general purpose computer system or a dedicated machine), or a combination of both.

Referring to FIG. 6, the process begins by processing logic accessing document logs and a publication structure (processing block 602). In one embodiment, the logs are lists of sequentially hashed (or rolling checksums) of data entries where each entry is a hash value computed from the data associated with the entry concatenated with the hash value of the previous entry in the list. Furthermore, the publication structure is based on one of the publication protocols, such as direct publication, round robin publication, or random publication, discussed in detail above.

Figure 11:
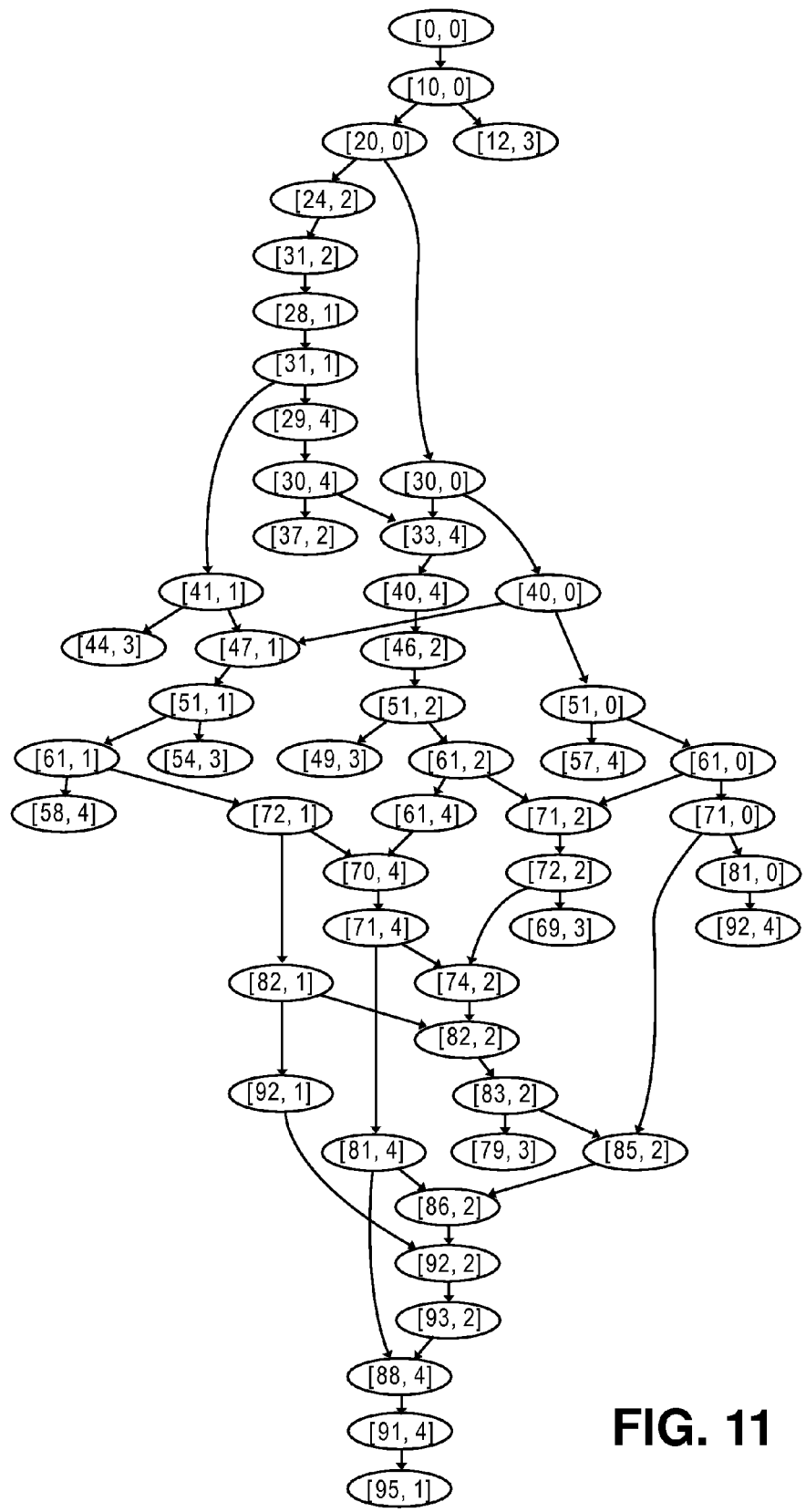
FIG. 11 illustrates a publication graph that was created from five logs.

In one embodiment, the process includes processing logic constructing the publishing graph for log entries of the accessed logs and publication structure (processing block 604). In one embodiment, the publishing graph is constructed for a specific log entry l. FIG. 11 illustrates an entanglement graph that was created from five logs in accordance with the discussion above. In one embodiment, the graph can be stored in a data structure in the form of nodes and edges that represent the publication graph.

From the publishing graph, processing logic determines the probabilities of verification failure for each log entry (processing block 606). Processing logic further determines the loss value for each log entry (processing block 608). In one embodiment, the log entries are those log entries added to the log prior to l.

After determining the probabilities of verification failure and loss values, processing logic determines the risk of verification failure (processing block 610). Thus, the overall risk of verification failure for a log and publication structure is estimated.

Figure 7:
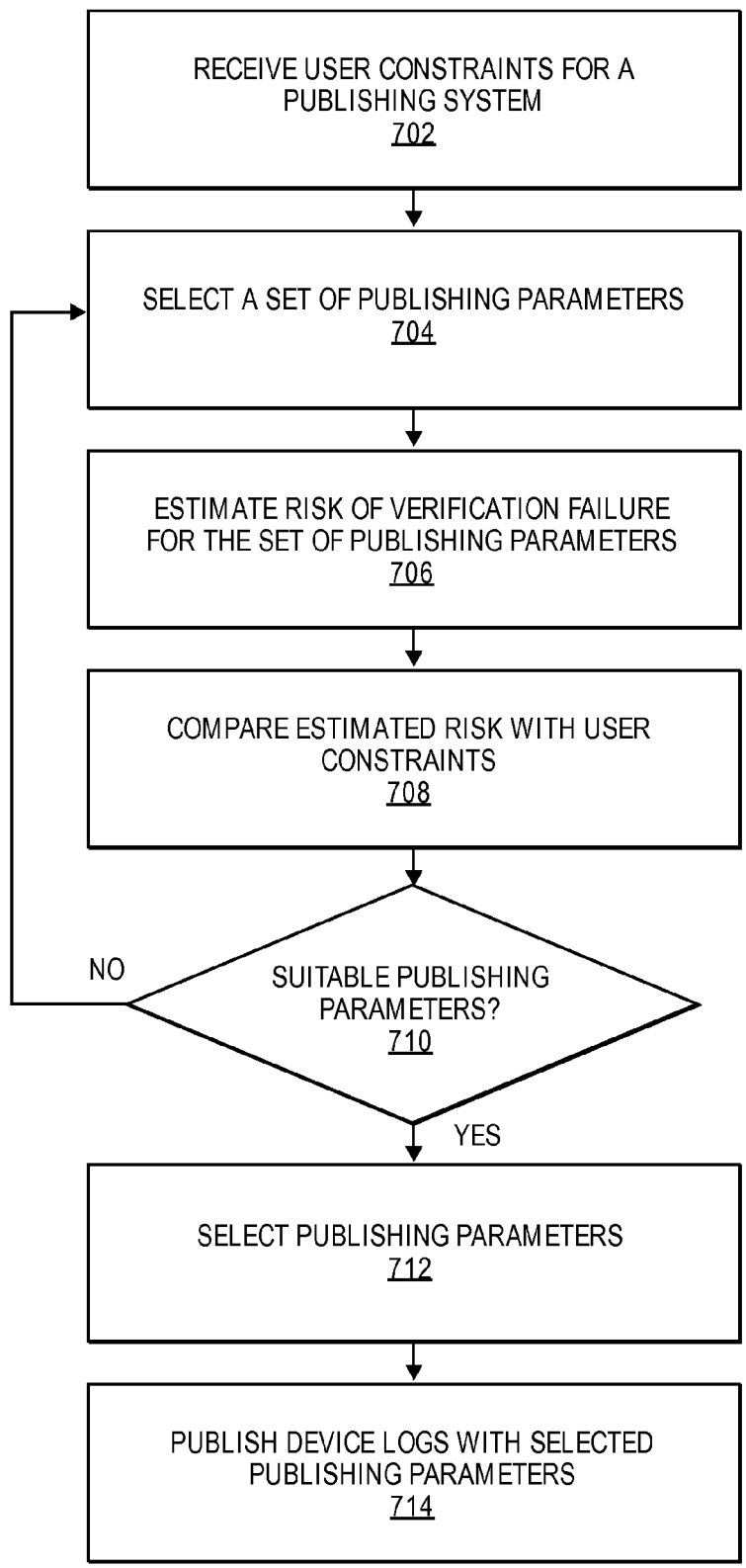
FIG. 7 is a flow diagram of one embodiment of a process for determining publication policy and parameter selection.

FIG. 7 is a flow diagram of one embodiment of publication policy and parameter selection. The process is performed by processing logic that may comprise hardware (circuitry, dedicated logic, etc.), software (such as is run on a general purpose computer system or a dedicated machine), or a combination of both.

Referring to FIG. 7, the process begins by processing logic receiving user constraints for a publishing system (processing block 702). In one embodiment, the user constraints specify such factors as the maximum number of possible receivers, specific receivers, budget limits for a document logging, disk space available for a log, transmission costs (i.e., such as cost of logging service, cost of bandwidth consumed during logging, time of day, etc.) etc. Furthermore, the user constraints may include a value assigned to a document being logged and/or a value assigned to each log entry.

In one embodiment, processing logic then selects a set of publishing parameters (processing block 704). The publishing protocol to be evaluated is selected from the direct, round robin, and random publication protocols discussed above, and an interval and the number of receivers for the protocol are also selected. In addition to the specific publishing policy selected, other factors such as the publishing interval, publishing frequency, number of receivers, specific publishers, specific trusted logs, etc. are also selected by processing logic.

After receiving user constraints and selecting publishing parameters, processing logic estimates the risk of verification failure for the set of publishing parameters (processing block 706). In one embodiment, the estimation of risk of verification failure is made as discussed above in FIG. 6.

Processing logic then compares the estimated risk with received user constraints (processing block 708). If processing logic determines that the estimated risk does not satisfy the user constraints (processing block 710), processing logic return to processing block 704 to select a new set of publishing parameters. In one embodiment, the new publishing parameters can be selected based on why the customer constraints were not met, such as by reducing the publication interval to reduce cost, or increase the frequency of publishing to reduce risk of verification failure.

However, if processing logic determines that the estimated risk does satisfy the user constraints, processing logic selects the publishing parameters (processing block 712). Thus, given user constraints and publishing protocols, a publishing protocol and the parameters for the protocol can be selected. Processing logic then publishes logs entries in logs according to the selected publishing parameters (processing block 714).

In addition to selecting an appropriate publication policy based on user constraints, the techniques discussed herein may also be utilized to select receivers from a pool of candidate receivers. Receiving services and/or trusted log receivers are not created equally. Some receivers will have a lower associated verification failure probability based on historical information, the receivers' equipment, the receivers' policies, etc.

Figure 8:
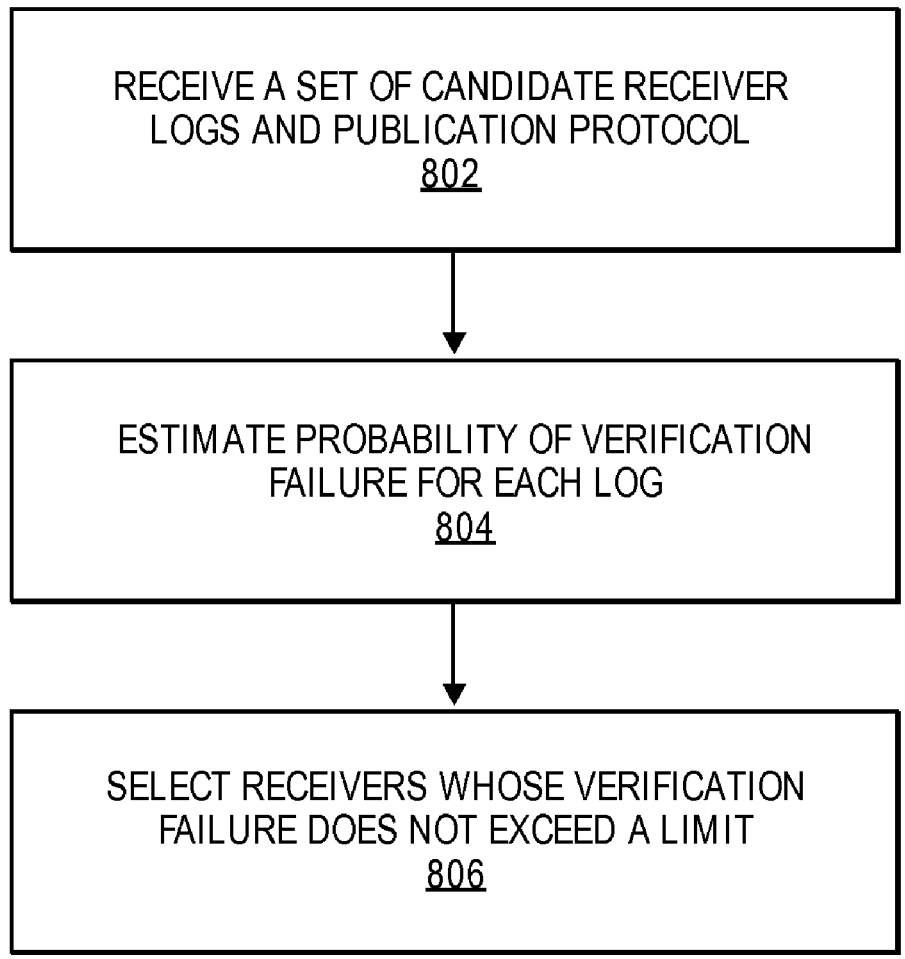
FIG. 8 is a flow diagram of one embodiment of a process for receiver selection.

FIG. 8 is a flow diagram of one embodiment of receiver selection. The process is performed by processing logic that may comprise hardware (circuitry, dedicated logic, etc.), software (such as is run on a general purpose computer system or a dedicated machine), or a combination of both.

Referring to FIG. 8, the process begins by processing logic receiving a set of candidate receiver logs and a publication protocol (processing block 802). The probability of verification failure for each log is then estimated (processing block 804). In one embodiment, the probability of verification failure is estimated as discussed above. From the results of the probability of verification failure, processing logic selects those receivers whose verification failure does not exceed a limit (processing block 806).

In one embodiment, selection and utilization of a publishing protocol is dynamic and adjusts based on the value of one or more log entries. For example, if a particular log entry corresponds to a final draft of a document, a user-assigned value placed on the document can be much higher than those on preliminary drafts. The higher value associated with the document will impact the associated risk of verification failure estimation, as discussed above. In light of the increased value placed on the document, the publishing scheme may also need adjusting. Thus in one embodiment, if a log entry with an exceptionally high, low, or change in value is added to a log, the parameters in the publishing protocol may be changed in response to risk estimation for the given protocol in order to lower associated risk.

Figure 9:
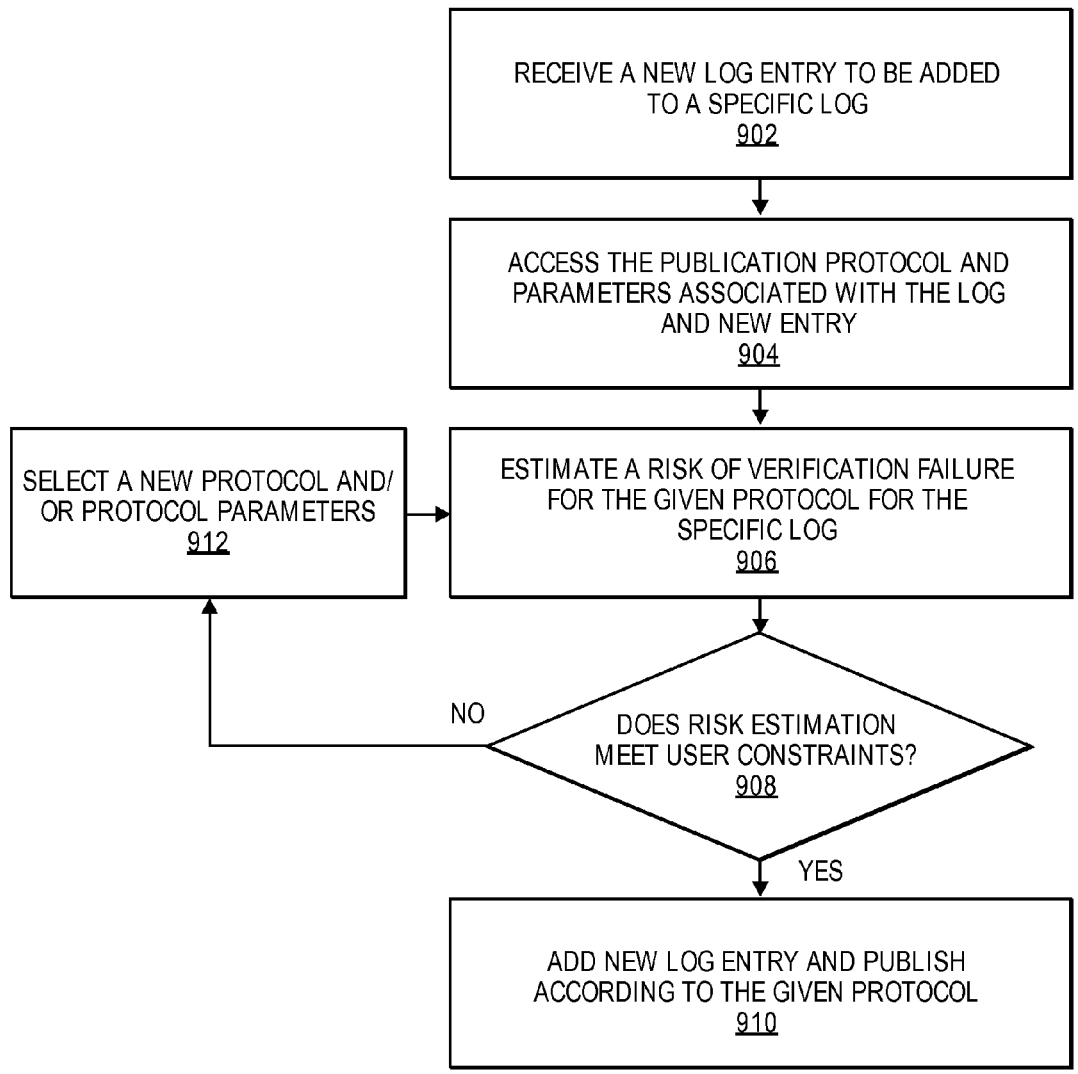
FIG. 9 is a flow diagram of one embodiment of a process for publishing protocol and parameter adjustment in response to a log entry.

FIG. 9 is a flow diagram of one embodiment of publishing protocol and parameter adjustment in response to a log entry. The process is performed by processing logic that may comprise hardware (circuitry, dedicated logic, etc.), software (such as is run on a general purpose computer system or a dedicated machine), or a combination of both.

Referring to FIG. 9, the process begins by processing logic receiving a new log entry to be added to a specific log (processing block 902). In one embodiment, the log entry includes user constraints, such as the value placed on the specific log entry, budget limitations, etc.

Because the log entry is for a specific log, processing logic accesses the publication protocol and parameters associated with the log and new entry (processing block 904). From the accessed publication protocol, publishing parameters, and value assigned to the new log entry, processing logic estimates a risk of verification failure for the given protocol for the specific log (processing block 906). As discussed in greater detail above, factors such as the type of publishing protocol (e.g., direct, circular, or random) utilized, logging frequency, number of receivers, etc. impact the risk of verification failure for a each given log entry.

Processing logic utilizes the determined risk to decide if the risk estimation meets the user's constraints (processing block 908). When the new log entry, with associated values, satisfies the existing publication protocols and parameters, the new log entry is added and published according to the given protocol (processing block 910).

However, when the existing publication protocols and parameters do not satisfy the user constraints for the new log entry, processing logic selects a new protocol and/or protocol parameters (processing block 912). Processing logic returns to processing block 906 to determine the risk of verification failure for the newly selected protocols and/or parameters. The process repeats until a publishing protocol and publishing protocol standards, which satisfy user constraints, is found.

An Example of a Computer System

FIG. 10 is a block diagram of a computer system that may perform one or more of the operations described herein. Referring to FIG. 10, computer system 1000 may comprise an exemplary client or a server computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, etc.

System 1000 further comprises a random access memory (RAM), or other dynamic storage device 104 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:
   accessing a first log published to one or more logs, wherein a log is a sequential list of rolling checksum hash values for content associated with the log; and
   estimating, with a computer processing system, a probability that an entry within the first log will not be verifiable from a second entry selected from one of the one or more logs.

2. The method of claim 1, further comprising:
   estimating a risk of verification failure for the entry, as a combination of the estimated probability and a loss value associated with verification failure.

3. The method of claim 1, wherein the estimation is based on a publication protocol that defines how entries from the first log are published to a trusted log from the one or more logs.

4. The method of claim 3, further comprising:
   selecting the publication protocol from a set of publication protocols based on the estimation.

5. The method of claim 4, wherein a first type of publication protocol is a direct publishing protocol where every T-th entry of the first log is published to the trusted log.

6. The method of claim 1, further comprising:
   estimating a probability that one or more log entries in the first log cannot be verified.

7. A method, comprising:
   accessing a first log published to one or more logs;
   estimating, with a computer processing system, a probability that an entry within the first log will not be verifiable from a second entry selected from one of the one or more logs, wherein the estimation is based on a publication protocol that defines how entries from the first log are published to a trusted log from the one or more logs; and
   selecting the publication protocol from a set of publication protocols based on the estimation, wherein a second type of publication protocol is a round robin publishing protocol where every T-th entry of the first log is published to one of R logs, wherein one of the R external logs is the trusted log, and the log entries from the first log are published to the R logs in round robin fashion.

8. A method, comprising:
   accessing a first log published to one or more logs;
   estimating, with a computer processing system, a probability that an entry within the first log will not be verifiable from a second entry selected from one of the one or more logs, wherein the estimation is based on a publication protocol that defines how entries from the first log are published to a trusted log from the one or more logs; and
   selecting the publication protocol from a set of publication protocols based on the estimation, wherein a third type of publication protocol is a random publishing protocol where every T-th entry of the first log is published to one of R logs, wherein one of the R external logs is the trusted log, and the log entries from the first log are published to the R external logs based on a random selection of a receiving log from the R logs.

9. A method, comprising:
   accessing a first log published to one or more logs;
   estimating, with a computer processing system, a probability that an entry within the first log will not be verifiable from a second entry selected from one of the one or more logs;

estimating a probability that one or more log entries in the first log cannot be verified; and estimating a risk of verification failure for the first log, wherein the risk of verification failure is the sum of a combination of the estimated probabilities of log entry failures and a loss value associated with verification failure for all log entries in the first log.

10. A method, comprising:

accessing a first log published to one or more logs; and estimating, with a computer processing system, a probability that an entry within the first log will not be verifiable from a second entry selected from one of the one or more logs, wherein estimating the probability further comprises, accessing the first log and a publication protocol associated with the first log, constructing a graph that models the first log published to the one or more logs, and estimating the probability by determining a probability that at least one path from the entry to a trusted log entry, from the one or more logs, exists.

11. A method, comprising:

receiving one or more log publishing constraints;

selecting a publication protocol based on the one or more log publishing constraints; and publishing, with a computer processing system, log entries of a first log into at least one log based on the selected publication protocol, wherein a log is a sequential list of rolling checksum hash values for content associated with the log.

12. The method of claim 11, wherein the at least one log includes a plurality of distinct logs.

13. The method of claim 11, wherein the selected publication protocol includes two or more types of publication protocols.

14. A method, comprising:

receiving one or more log publishing constraints;

selecting a publication protocol based on the one or more log publishing constraints, wherein selecting a publication protocol based on the one or more log publishing constraints, further comprises, estimating a risk of verification failure for the selected publication protocol, comparing the determined risk with an acceptable risk from the received one or more log publishing constraints, and selecting a new publication protocol, for risk estimation, when the estimated risk of verification failure for the selected publication protocol exceeds the acceptable risk; and publishing, with a computer processing system, log entries of a first log into at least one log based on the selected publication protocol.

15. A method, comprising:

receiving one or more log publishing constraints;

selecting a publication protocol based on the one or more log publishing constraints, wherein the log publishing constraints include one or more user-defined constraints selected from the list of a band-width limit, a log publication frequency limit, a number of logs in a publication network, a limit on storage space allocated to a log, a cost associated with the selected publishing protocol, and choice of publication protocol; and publishing, with a computer processing system, log entries of a first log into at least one log based on the selected publication protocol.

16. A system, comprising:

means for receiving a set of candidate receiver logs and a publication protocol; and means for estimating a probability of verification failure for each candidate receiver log based on a publication protocol.

17. A method, comprising:

receiving a log entry to be added to a log;

accessing a publication protocol and publishing parameters associated with the log; and estimating, with a computer processing system, a risk of verification failure for the log entry based on the publication protocol and publishing parameters.

18. The method 17, further comprising:

accessing user constraints for logging the log entry in the log;

estimating the risk of verification failure for the log entry satisfies an acceptable risk value from the user constraints;

estimating a cost associated with publishing log entries utilizing the publishing protocol and the publishing parameters does not exceed a cost value from the user constraints; and selecting at least one of a new publication protocol or new publishing parameters when the user constraints are not satisfied.

19. The method of claim 18, further comprising:

adding the new log entry to the log based on the selected new publication protocol or new publishing parameters.

20. A non-transitory computer readable medium storing instructions thereon which, when executed by a system, cause the system to perform a method comprising:

receiving a log entry to be added to a log;

accessing a publication protocol and publishing parameters associated with the log; and estimating a risk of verification failure for the log entry based on the publication protocol and publishing parameters.

21. A system, comprising:

means for receiving a log entry to be added to a log;

means for accessing a publication protocol and publishing parameters associated with the log; and means for estimating a risk of verification failure for the log entry based on the publication protocol and publishing parameters.

\* \* \* \* \*